United States Patent

Ash et al.

[11] Patent Number: 5,160,482
[45] Date of Patent: Nov. 3, 1992

[54] ZIRCONIUM-HAFNIUM SEPARATION AND PURIFICATION PROCESS

[75] Inventors: Kenneth C. Ash, Corvallis; William A. Crocker, Salem; John C. Haygarth, Corvallis; David R. Lee, Lebanon; Donald Morris, Corvallis; John R. Peterson, Salem; Jon A. Riesen, Albany; Robert S. Yih, Salem, all of Oreg.

[73] Assignee: Teledyne Industries, Inc., Albany, Oreg.

[21] Appl. No.: 318,161

[22] Filed: Mar. 2, 1989

[51] Int. Cl.$^5$ .............................................. C22B 34/00
[52] U.S. Cl. ...................................... 423/75; 423/74; 423/140
[58] Field of Search ..................................... 423/74, 75

[56] References Cited

U.S. PATENT DOCUMENTS 2,740,709  4/1956  Herres .................................. 75/743

Primary Examiner—Peter D. Rosenberg
Attorney, Agent, or Firm—Shoemaker and Mattare, Ltd.

[57] ABSTRACT

A process for the recovery of substantially pure zirconium values from zircon sand which also contains Ra, U, Hf, Pb and other metal values, comprising contacting zircon sand in a chlorinator with a chlorination medium to form an off-gas steam containing chlorides of Zr, Hf, Si, and tract U. The off-gas steam is passed to a condenser to remove volatile Si chlorides and thereby provide a product stream containing condensed chlorides of Zr, Hf and tract U, treating the product steam in acidic aqueous medium in a separation stage to separate the principla Hf values from the principal Zr values. Adjusting the pH of the resulting effluent to between about 3 to about 7 in a second stage to precipitate the trace U values. The residue stream is treated by (A) leaching with an acidic aqueous system to solubilize the trace Ra, Pb and other metal values while settling out the unreacted zircon sand and chlorination medium, and contacting the resultant leach liquor first with Ba++ ions and then with SO$_4$= ions to co-precipitate the barium and trace radium ions as a sulfate complex and the trace lead and other metal ions as their sulfates, or by (B) contacting at least a portion of the residue stream with an aqueous system containing CO$_3$=, SO$_4$= or PO$_4$= or mixtures thereof to precipitate and render the trace metal values substantially non-leachable with water, or by (C) contacting the leach liquor from (A) with CO$_3$= in a pH buffered, basic aqueous system to precipitate the trace metal values as non-leachable carbonates.

29 Claims, 8 Drawing Sheets

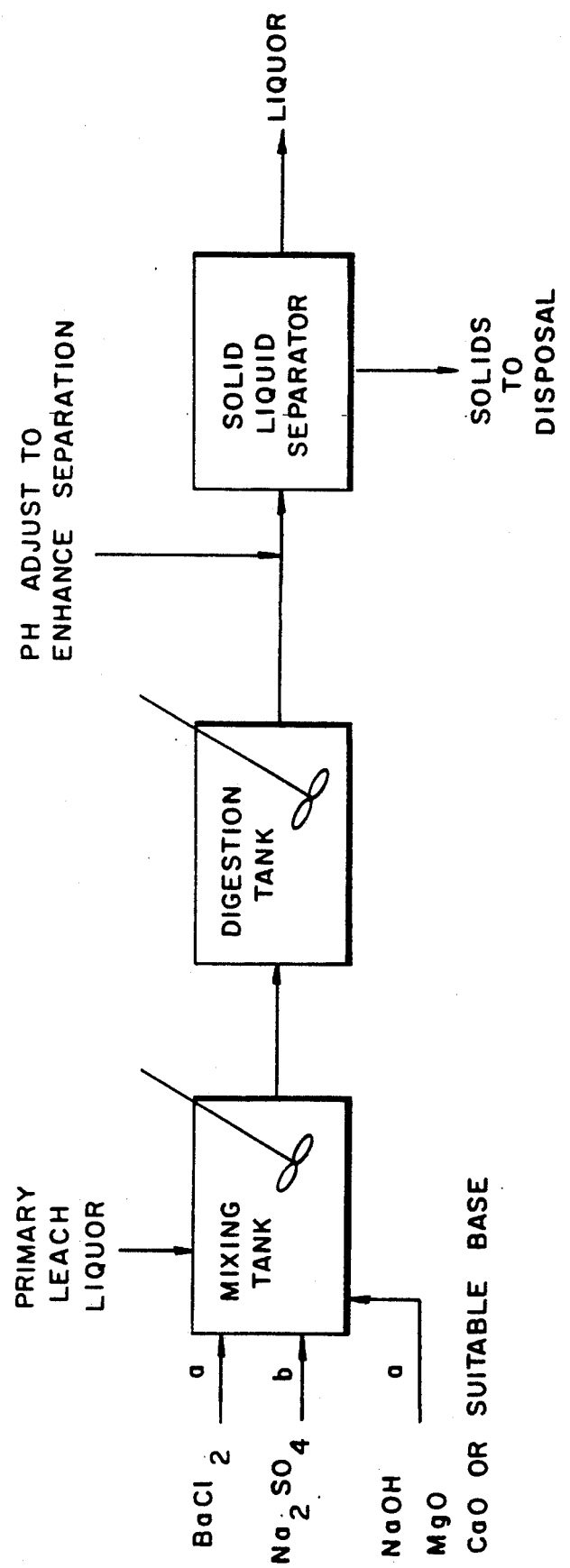

ZIRCONIUM-HAFNIUM SEPARATION AND PURIFICATION PROCESS

This invention concerns a recovery process for obtaining zirconium and hafnium from zirconium containing ores typically containing varying amounts of zirconium contains varying amounts, e.g., up to 10% by weight of hafnium typically as the oxide, and also small or trace amounts of elements and compounds including radionuclides and other undesirable substances. The invention also concerns the treatment of waste or by-product materials containing radionuclides and other undesirable substances in a highly efficient manner wherein such components are readily concentrated and isolated, if desired, for disposal or sale, and for greatly reducing waste disposal problems and disposal costs. This invention further concerns the monitoring of radiation from naturally occurring radioactive species and control of radioactive substances particularly radium, uranium and thorium as an intrinsic aspect of the overall recovery process.

In the processing of zirconium containing ore to recover high purity zirconium it is conventional to mix coke with the comminuted zirconium containing ore or sand and chlorinate the products thereof (carbo-chlorination), separate the crude $ZrCl_4$ containing hafnium from by-products such as CO and $SiCl_4$, complex the zirconium and hafnium with $NH_4CNS$, and extract from an acidic aqueous solution the hafnium complex from the zirconium complex with organic solvent such as methyl isobutyl ketone (MIBK). This technology is taught, for example, in U.S. Pat. Nos.:2,938,769; 2,952,513; 3,069,232; 3,006,719; and 4,202,862; and the references cited therein, the disclosures of all of said patents being incorporated herein by reference.

The zirconium containing ores typically contain small or trace amounts of radioactive materials, containing elements such as U, Ra and Th, and compounds thereof, and undesirable materials such as lead containing compounds, which are carried through the process and eventually report in waste effluent sludge, settling ponds and the like. Also, in certain separation processes wherein the ore is cracked by such means as caustic fusion, the carry-over of such contaminating materials into the product itself is difficult to avoid. In either the waste materials, or the product itself, the levels of radioactivity must by both state and federal regulations be maintained at very low levels. The other undesirable materials such as lead or lead containing compounds, must not be leachable from the waste as determined by standard EPA tests.

In the known processes employed for the production of purified Zr and/or Hf compounds, particularly in the aforementioned carbo-chlorination process, the various aqueous product streams, recycle streams, waste and other effluents or liquors, usually eventually contain Zr, Hf, U and trace amounts of other ions. These elements may, for example be in their soluble chloride or sulfate forms, or the oxy derivatives thereof. The concentrations of each of these will, of course, vary for each stream. As a result of the solvent extraction scheme, the Zr-free Hf raffinate and the Hf-free Zr raffinate are pH adjusted and the metals precipitated. The precipitates can then be further treated for use or sale. The effluent from the Hf precipitation is recycled in the plant while the effluent from the Zr precipitation is further processed to remove the Uranium and the ammonia. The Zr precipitation effluent is neutralized when it is further processed. It is noted that the neutralization precipitates of Zr, Hf and U are all very insoluble hydroxides or complexes thereof. It is further noted that where waste or other streams are not neutralized to precipitate the metal values, the large volumes of waste materials sent to sludge ponds or the like represents unacceptable economic burdens on the manufacturer, especially where stringent governmental controls on radionuclides or toxic substances apply.

In a similar manner, residues of the carbo-chlorination process are comprised of radionuclides and other undesirable components which render disposal very costly. These residues constitute unreacted reductant and/or zirconium-containing ore which are contaminated primarily with the non-volatile chlorides of the various metallic impurities which naturally occur in the ore, and include radionuclides such as Ra and Th and other undesirable components such as Pb. Again, disposal of such residues is costly and complicated by the presence of both radionuclides and heavy metal constituents. The acceptable radionuclide and toxicity levels for a particular disposal site are designated by governmental regulations for such residue disposal and said levels therefore dictate the difficulty and expense of using a particular disposal site.

A principle object therefore of the present invention is to provide a Zr/Hf recovery and purification process generally, procedures for capturing, segregating as needed, and concentrating the radioactive or otherwise toxic materials derived from the processing ores such that they can be disposed of legally and safely in an economically acceptable manner.

A specific object is in a Zr/Hf recovery and purification process wherein the Zr and Hf are first obtained from the zircon ore as gaseous chlorides through high temperature carbo-chlorination of the ore, and wherein the chlorination residue contains unreacted ore and coke, low level radioactive material and toxic lead containing material, to provide highly effective procedures for separating out unreacted ore, unreacted coke, and either mixed or separate Ra and Pb, and to convert them to non-leachable compounds of small mass relative to said ore and coke and to any leach, precipitation or other aqueous media.

Another object is to provide such procedures in a Zr-Hf separation portion of a Zr/Hf recovery and purification process, wherein the Zr, Hf and other metals are converted to soluble salts and separated by solvent extraction into separate acidic aqueous streams wherein trace amounts of ionized U and Hf salts are present in the Zr salt stream, and wherein the Zr and Hf ions are precipitated in a first stage away from the U salt, and the U ions are then precipitated in a second stage away from the resultant aqueous medium.

Another specific object is to provide the aforesaid carbo-chlorination and solvent extraction process with built-in and regulatable processing operations for handling radioactive and toxic components such that excessive levels thereof can be efficiently captured in relatively small waste volumes and effectively isolated for sale or for economically acceptable disposal.

A further specific object is to provide the built-in and regulatable processing operations for the above objectives such that said operations lend themselves to ready response to analytical monitoring of the overall recovery and purification process, whereby factors which are causing, for example, high U, Ra or Pb levels can be readily accommodated by adjusting said operations until said factors have been eliminated or mitigated.

It is a still further object of the present invention to provide a separation process as described herein which segregates undesirable waste and to prevent release to the environment.

BRIEF SUMMARY OF THE INVENTION

These and other objects hereinafter appearing have been attained in accordance with the present invention which is defined as a process for the recovery of substantially pure metals from ores which may contain Ra, U, Th, Pb and other elements, said process when applied to extracting zirconium from ores by chlorinating the ore at preselected temperatures and pressures in a chlorinator with a chlorination agent and/or a reductant, comprises the steps of chlorinating the ore to form a gaseous stream containing volatile chlorides, including those of Zr, Si, Hf, and trace U, and to form a solids containing residue stream containing non-volatile components including reductant, unreacted ore and non-volatile metal salts, wherein said process said gaseous stream is passed to condensers which first remove zirconium tetrachloride and subsequently silicon tetrachloride and thereby provide a first product stream containing condensed chlorides of Zr, Hf and trace U, alternatively then treating said first product stream by forming an acidic aqueous medium in a separation stage to separate the Hf from the Zr, or in an anhydrous extractive distillation process wherein said elements are discharged from the separation stage in soluble salt form in separate effluent streams each of which contains minor of the other metal, and either or both of which streams contains said trace amounts of U, also in soluble salt form, removal of Zr and Hf from said respective streams, recycle of effluent from Hf separations and treating the Zr effluent by adjusting the pH of said Zr effluent stream or portions thereof in a first precipitation stage to between about 1 to about 3 to precipitate said minor amounts of Zr and Hf, and adjusting the pH of the resulting effluent to between about 3 to about 7 in a second stage to precipitate said trace amounts of U, and wherein said process said solids containing residue stream is treated by (A) leaching with an acidic aqueous system to solubilize said trace Ra, Pb and other elements while settling out said unreacted ore and/or reductant and contacting the resultant leach liquor first with a soluble barium compound and then with a soluble sulfate to co-precipitate the barium and trace radium ions as a sulfate, and other metals as their sulfates, hydroxides or other insoluble compounds, or (B) contacting at least a portion of said residue stream with salts containing $CO_3=$, $SO_4=$ or $PO_4=$ or mixtures thereof, and sufficient base to maintain a soil pH greater than about 7 and to render said trace amount of lead substantially non-leachable in the standard EPA test.

In certain preferred embodiments:

1) the said unreacted ore, zircon sand, and reductant are recycled to said chlorinator; and 2) the said unreacted reductant from the leaching step is carbon coke which is separated by flotation from the unreacted zircon sand, and wherein said ore is then recycled to said chlorinator; and 3) filter means are provided in said gaseous stream from the chlorinator to prevent passage of solids to said condenser; and 4) the said residue in (B) is contacted with $CO_3=$ in a magnesium oxide base system; and 5) the said principle amounts of Zr and Hf are separated by extraction of Hf in a solvent medium.

BRIEF DESCRIPTION OF THE DRAWINGS

The invention will be further understood from the following description and drawings wherein:

FIG. 8 is a flow diagram of the precipitation of dissolved metals.

Figure 1:
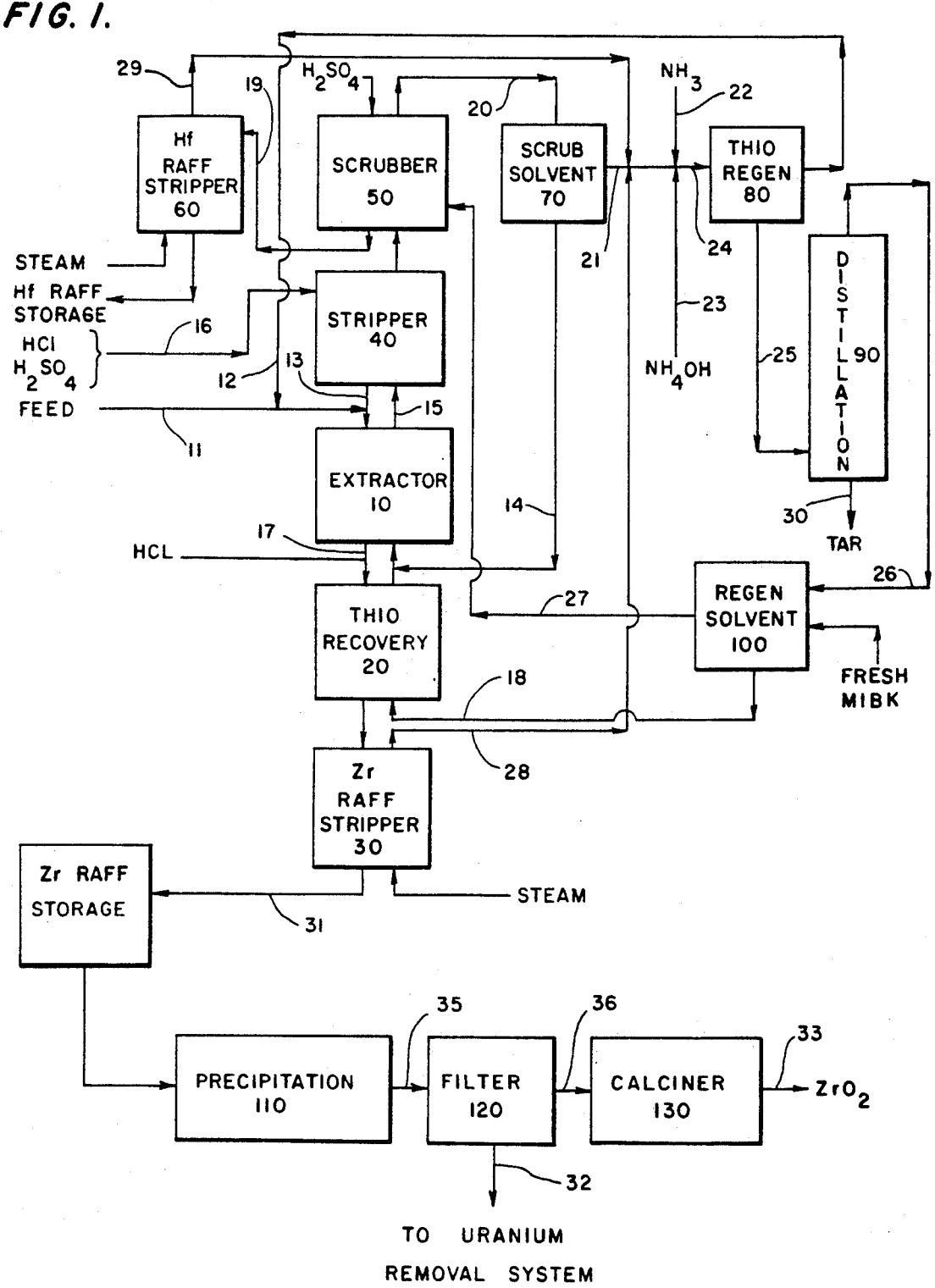
FIG. 1 is a partial schematic of the zirconium-hafnium separation process of the present invention.

Referring to the schematic in FIG. 1, crude $ZrCl_4$ containing the $HfCl_4$ and uranium compounds, uranium species such as stated in U.S. Pat. No. 3,006,719, the oxychloride (oxide-chloride) of the metals obtained from the carbochlorination of the zirconium ore, dissolved in water and adjusted with aqueous ammonia is introduced via line 11 to the $NH_4CNS$ stream line 12. In a manner substantially described in said U.S. Pat. No. 3,006,719, the resultant material is fed into the extraction column 10 containing the liquid-liquid extraction media MIBK and thiocyanate. It is noted that thiocyanate complexes of the zirconium and hafnium may also be formed in the extraction column.

Hydrochloric acid and sulfuric acid are passed to the top of column 10 via line 13 from column 40 while MIBK and thiocyanate recycle are added at the bottom via line 14. At the top of column 10, an organic phase comprising MIBK, hafnium thiocyanate complex, and other compounds, is recovered and passed via line 15 to column 40 where it is countercurrently contacted with downwardly flowing sulfuric acid and hydrochloric acid entering via line 16. At the bottom of column 10, a zirconium oxychloride solution or raffinate is recovered via line 17. In addition to zirconium oxychloride, the recovered raffinate will contain ammonium chloride, thiocyanic acid and traces of other materials, including soluble uranium salts. The thiocyanic acid may be recovered by scrubbing, in column 20, with the purified MIBK entering via line 18. From the bottom of column 50 the acid-scrubbed hafnium material is recovered via line 19 and will comprise, primarily hafnium oxysulfate, sulfuric acid and traces of other materials; MIBK and thiocyanic acid are recovered at the top of column 50 and passed via lines 20 and 24 to thiocyanate regeneration mixer settler 80 wherein the thiocyanic acid is reacted with ammonia and ammonium hydroxide entering the mixer settler via lines 22, 23 and 24. The ammonium thiocyanate recovered from the mixer settler 80 is passed via line 12 for admixture in with the zirconium and hafnium oxychloride solution to column 10. MIBK is recovered from mixer settler 80 and passed via line 25 to distillation column 90. Distilled MIBK passes via lines 26 and 18 to the thiocyanate recovery column 20. Distilled MIBK also passes via lines 26 and 27 to column 50 for thiocyanate recovery. It is contemplated that from about 60% to about 80% of the MIBK and thiocyanic acid recovered at the top of column 50 is recycled directly via line 14 into column 10.

The above description of the basic structural elements and material flow patterns are, as stated hereinbefore, substantially as described in U.S. Pat. No. 3,006,719.

Useful and typical operating feed rates and conditions for the basic recovery process in which the present invention is utilized are described in the aforesaid U.S. Pat. No. 2,938,769, and are specifically enumerated in Example 1 thereof, but which are scaled up to commercial quantities on the order indicated in the aforesaid U.S. Pat. No. 4,202,862. It is noted that multiple apparatus units and multiple purification passes may be utilized as is well known to the art and illustrated, for example, in U.S. Pat. No. 2,938,769 wherein a supplemental HCl stripping operation is employed for improving zirconium values recovery.

Figure 3:
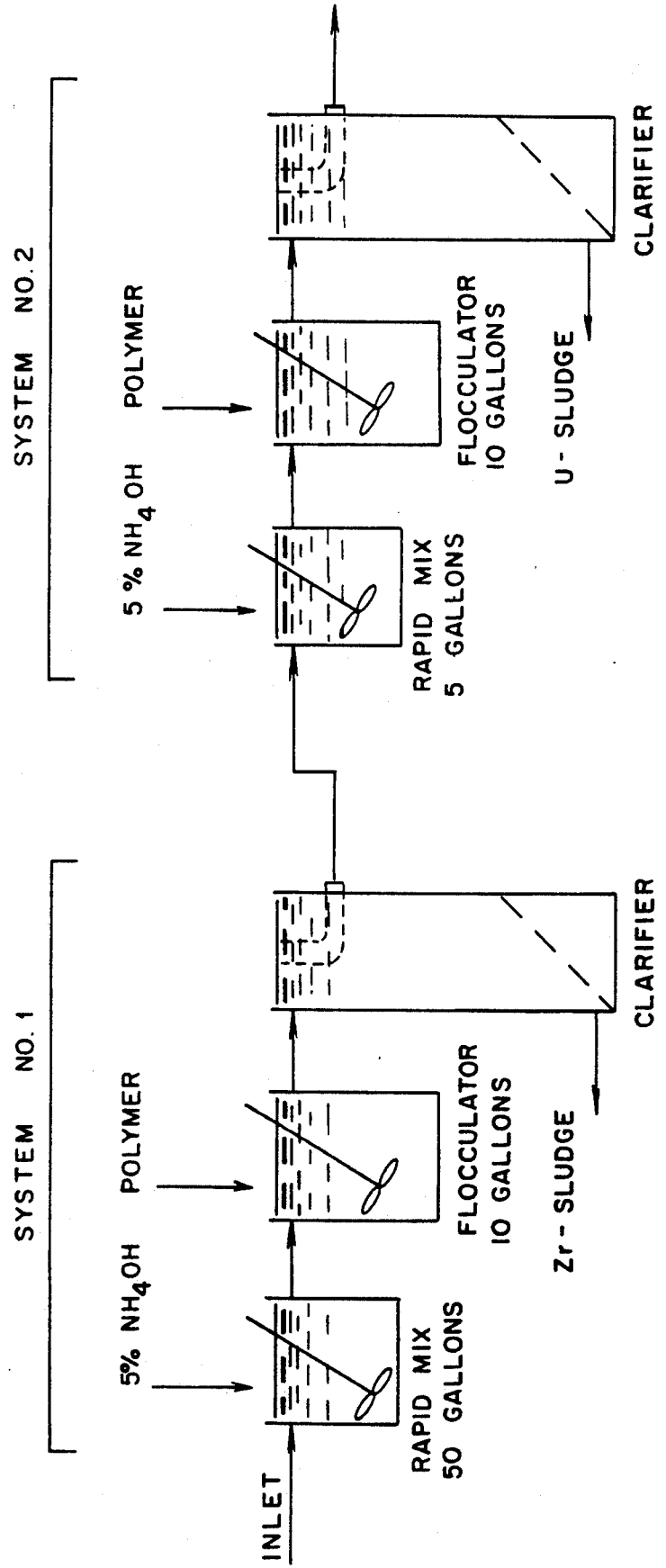
FIG. 3 is a schematic of a two stage precipitation apparatus.

The thiocyanate-free zirconium raffinate leaving the bottom of column 20 via line 34 enters column 30 where it is contacted with steam to remove any residual MIBK. The zirconium raffinate then enters tank 110 where the zirconium is precipitated as a hydroxide by treatment with base. This precipitate then enters filter 120 where it is separated from the aqueous raffinate. The filter cake leaves via line 36 to the calciner 130 where it is converted into zirconium oxide. The effluent, containing zirconium ions, traces of hafnium and uranium ions as well as other metallic ions, leaves filter 120 via line 32 and enters an apparatus such as shown and described in FIG. 3.

Figure 2:
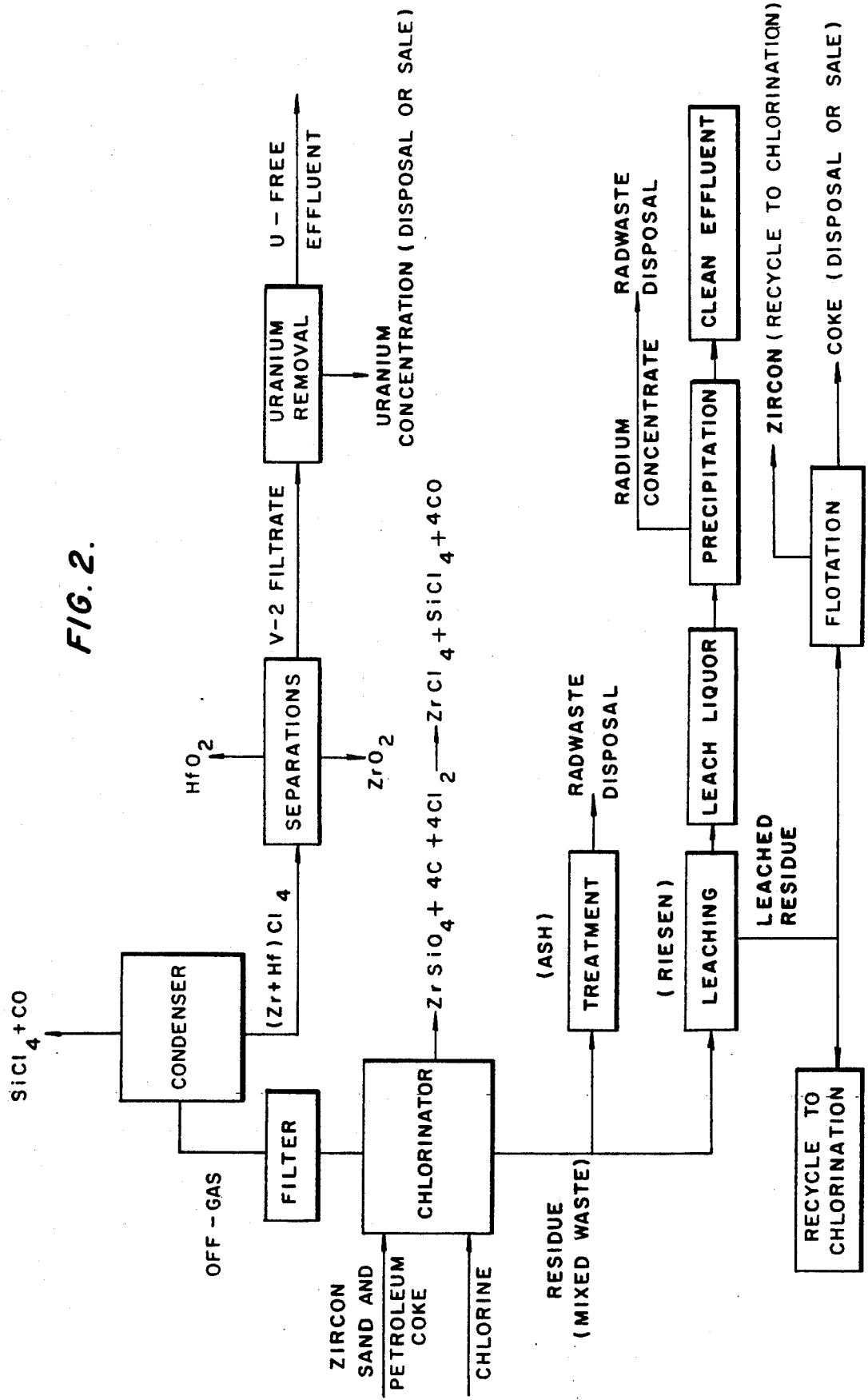
FIG. 2 is a block diagram of the present capture, segregation and concentration procedures as applied to the overall recovery process.

The block diagram of FIG. 2 shows and designates the various apparatus or chemical treatment centers of the overall recovery process including the present waste treatment procedures. Referring first to the SEPARATIONS block, the $ZrO_2$ and $HfO_2$ products are obtained through calcining of the Zr and Hf hydroxides precipitated out of their respective soluble salt streams, i.e., streams 31 and 37 respectively in FIG. 1, by treatment with base material. The present invention is applicable to these streams as well as to other product streams, effluents, liquors and the like which contain either or both of Zr and Hf ions, and soluble U values. In accordance with the present invention, and as an exemplary embodiment, stream 32, which contains trace amounts of the other ions and/or soluble U values, is passed to an apparatus such as shown and described in FIG. 3. The process for which the apparatus is designed, i.e., for removing uranium from the extraction effluent, consists of two-stage pH adjustment with solids removal there-between. The effluent enters the first pH adjustment tank where the pH is adjusted from approximately 1 to a value of approximately 3. Flocculent is added in a second tank to the effluent before it is directed to the first clarifier. The clarified liquid then enters the second and similar pH adjustment stage where it is adjusted from a pH of approximately 3 to a pH of approximately 7. The effluent is then combined with flocculent and directed to the second clarifier. The solids are dewatered and then may be packaged for resale, further processing, and/or shipment to a disposal site.

This neutralization procedure allows the recycle and use of zirconium and hafnium by separating it from the uranium contained in the extraction effluents or wash liquors. It also allows the recycle, recovery for sale or disposal of uranium as a disposable plant sludge. This uranium cake is sufficiently concentrated to be used by uranium manufacturers.

This process also allows the treatment of additional chemical streams containing zirconium and hafnium compounds. These compounds may be relatively pure or may contain uranium or other heavy metals which can be separated by using this same equipment. The additional chemical streams may be treated exclusive of the normal separations liquors or treated jointly with the normal separations liquors.

In carrying out the present recovery process, it is highly desirable and preferred to provide an efficient filtering means for the carbo-chlorinator off-gases to essentially remove fine particulate solids entrained in the $ZrCl_4$ stream. Heretofore, filters have been used in such zircon sand chlorination, fluidized bed reactors to separate the reactor off-gas from the fine solids in the reactor to thereby provide a clean product and to minimize the spread of the radionuclides by constraining the dust within the reactor vessel. The filters, which it is emphasized, are operated above 330 degrees C. and preferably at around 350-420 degrees C. in a chlorine and/or metal chloride gas environment typically consists of 14-16 elements. Each element is an assembly of an 8-inch outside diameter by 68-inch long cylindrical expanded metal cage as the support (inside cage), soft woven filter fabric, clamping devices and two hemicylindrical expended metal cages (outside cages). The soft woven fabric filter material is composed of three individual layers. The inner two layers are heavy spun glass fabric with a chain weave pattern and have a typical chemical composition of 58-63% $SiO_2$, 16-24% $Na_2O$ and $K_2O$, 6-11% CaO and MgO, 2.5-6.5% $Al_2O_3$, and 2.5-7.5% $B_2O_3$. The outer layer is a high silica fabric with a satin weave pattern and has a typical chemical composition of 97.85% $SiO_2$, 0.8% $TiO_2$, 0.71% $Al_2O_3$, 0.23% CaO, 0.17% MgO, 0.16% $B_2O_3$, 0.03% $Na_2O$, and 0.01% $Fe_2O_3$. The three layers of fabric are wrapped on to the cylindrical metal support cage (inside cage), one after another, and are fastened by clamping (twisting) nichrome wire on each end and at the center of the element. The clamping technique has close similarity to the common practice in the fabric filter industry. See, M. Shackleton, R. L. S. Chang, J. Sawyer, and W. Kuby, "High-Temperature, High-Pressure Gas Cleanup With Ceramic Bag Filters," DOE/ET/17092-1504, Jan. 1984. The hemi-cylindrical metal cages are attached on to the wrapped inner cage.

Due in part to the chemical composition of the fabric, the filter can only last under the reactor environment for about three months on the average, and some filters can only last for a couple of weeks as the inner two layers become brittle and loose tensile strength. The outer layer simply disappears after about one week of operation. The dust collection efficiency of this kind of three-layer filter is about 92.9%. Because of the clamp and the clamping method, the fabric edge on both ends of the cylindrical support cage may not be perfectly sealed. The outer cages are needed in addition to the wires to prevent the fabric from slipping off the smooth metal support cage but the outer cages hinder the cleaning effort due to the extra dust retained between the filter surface and the outer cages.

It is desirable therefore, to provide a secure, leak proof clamping device to attach soft filter fabric to the rigid support cage, to extend filter life and to increase dust collection efficiency. Such results are realized by the present filter construction in which the end clamping plates provide a secure and leak proof way to attach tubular soft filter fabric to a rigid support cage, and in which particular types of ceramic yarn are selected to weave into filter fabric to extend the filter life, and in which new weave patterns are used to offer better dust collection efficiency.

Figure 5:
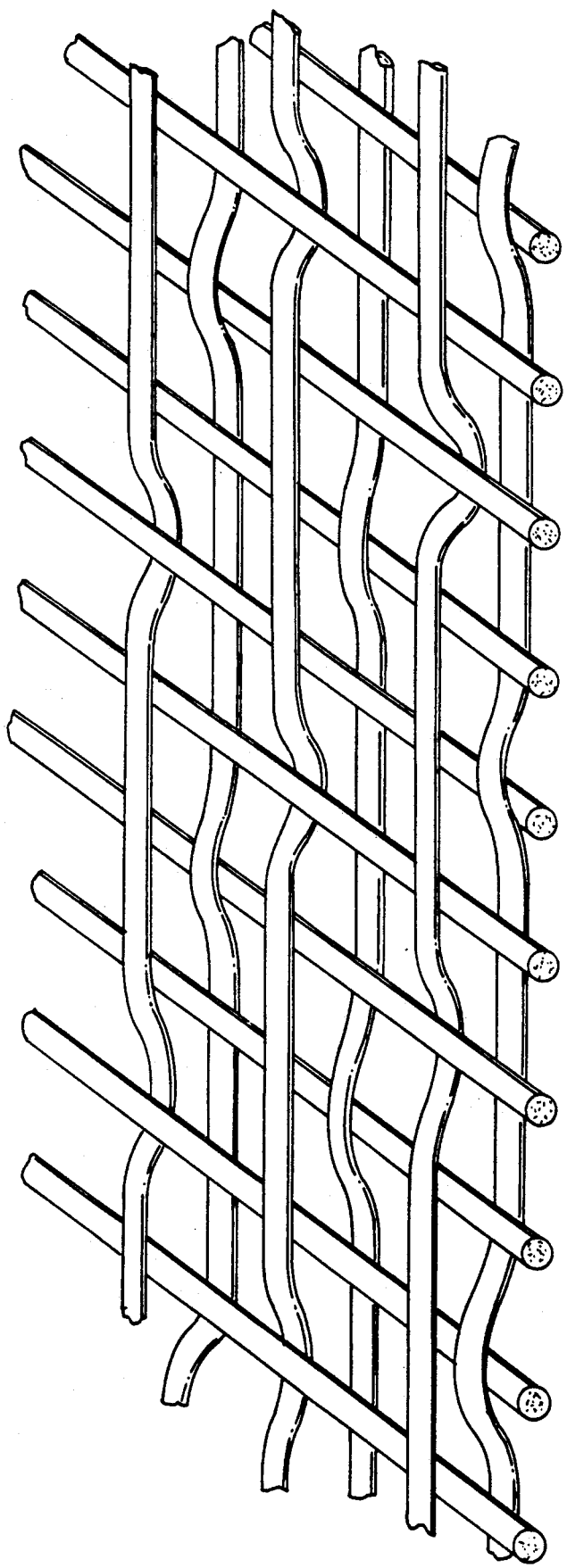
FIG. 5 is an isometric view of filter cloth having special utility in the filter mounting means of FIG. 4.

The new filter fabric may be woven by two types of yarn available commercially. Fabric woven with either type of yarn gives better dust collection and filter life. The first type is a composite ceramic yarn consisting of a staple yarn supported by a fiberglass core. The typical composition of the fiberglass core is 54% $SiO_2$, 15% $Al_2O_3$, 16% CaO, 9.5% $B_2O_3$, 5% MgO and 0.5% $Na_2O$. The typical composition of staple yarn is 52–53% $SiO_2$; 45–48% $Al_2O_3$. The fabric is woven into a seamless tube, preferably in a three by one twill pattern with double fill as shown in FIG. 5. This single layer of fabric provides about 99.98% dust collection efficiency due to the texture of the yarn and weave pattern. The material can survive in a normal reactor production environment for up to about 5 months. Another type yarn having even greater potential has a typical composition of 60% $SiO_2$, 23% CaO, 14% $Al_2O_3$ and about 3% of $TiO_2$, $Fe_2O_3$, MgO, $K_2O$ and $Na_2O$. The collection efficiency can be at least 99.98%, if a four by four twill with double warp and double fill is selected as the weave pattern.

Figure 4:
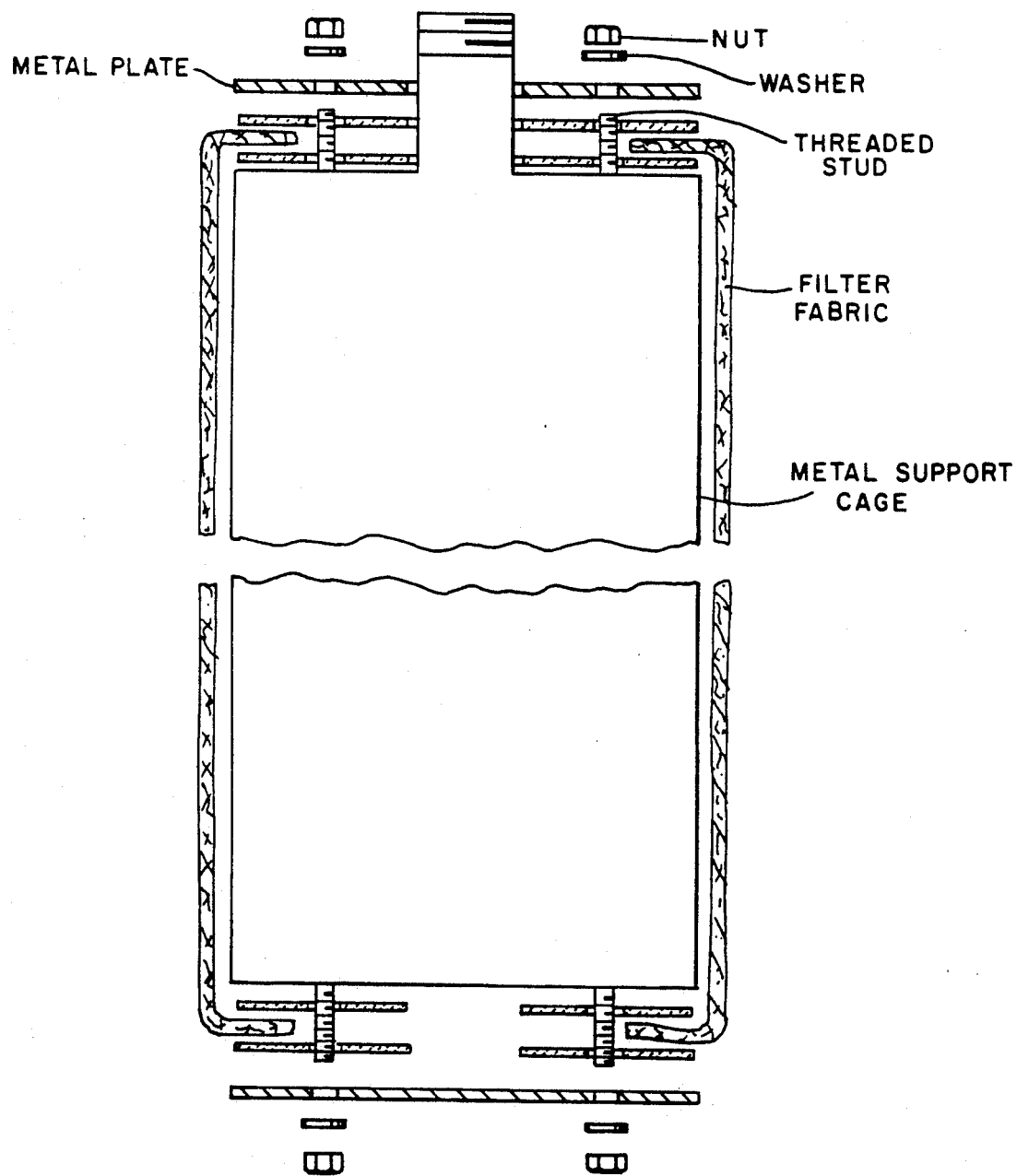
FIG. 4 is a partial schematic longitudinal cross-section of a filter mounting means having special utility in the present invention.

In assembling the present filter shown in FIG. 4, the filter fabrics are cut 3 inches longer than the cylindrical metal support cage and the extended part of fabric is folded over both edges of the cage onto the flat end surfaces. Ceramic gaskets are placed above and under the folded over fabric and metal plates 3/16 inch thick and 8½ inches in diameter are placed on top. Four threaded studs are welded to each flat end surface of the support cage with a bolt circle of 5 inches so that the metal plates can be fastened and tightened onto the flat surfaces by four nuts each. The bending of the soft filter fabric over the edges of the cage and the end metal plates eliminate any possible assembly defects which could occur with the prior wire clamp design.

This novel clamping device can be applied to any tubular fabric filter application in which soft fabric is attached to a rigid support. This clamping device can also be used with the ordinary band clamps to seal possible leaks for the broadcloth filter fabric. The conventional outside cages are no longer needed in the end plate clamping assembly.

In an exemplary use of the present filter design, a set of 14 filter elements with filter fabric woven with the composite ceramic yarn specified above, in a three by one twill double fill pattern, and the present plate assembly were installed in one chlorinator. The filters were in seamless tube form to eliminate any possible leak which might occur with overlapping filter fabric. The set provided adequate dust collection and lasted about 5 months. The plate assembly was found much easier to install and disassemble and was more effective, without the need of the two outside hemi-cylindrical cages. The filters also could be cleaned more easily. The pressure drop immediately after cleaning was about 2–5 inches of water at a space velocity of 1.5 ft per min. compared to 10 or more inches of water when the outside cages were used. The interval between cleaning is much longer for the present filters, thus the chances for purge gas damage on the filter fabric is greatly reduced.

Referring now to FIG. 2, the chlorinator residue contains compounds, typically chlorides, of thorium, radium, lead, scandium, yttrium and some rare earths. In one of various alternative residue treatment procedures which may be used in combination with the others described in the present invention, the residue is further treated to render the lead non-leachable as determined by the standard EPA test. After such treatment, the residue is merely a low-level radioactive waste that can be disposed of legally, if expensively. In this regard, chlorinator residue is quite bulky, and can be produced in relatively large quantities, so its disposal cost, which is charged on a volume basis, is quite high. In another of the alternative residue treatment procedures, removal of the soluble radionuclides and other undesirable substances by leaching the otherwise untreated residue yields a product which is essentially a mixture of petroleum coke and zircon. It is possible to recycle this leached residue to the chlorinator, if however, such is not desirable, the zircon and petroleum coke may be separated by a flotation process, to produce a petroleum coke suitable for sale or landfill disposal, the zircon then being recyclable or disposable. Finally, the liquor resulting from leaching of the chlorinator residue is treated to precipitate and concentrate the radionuclides and other undesirable substances, and this concentrate is rendered into a form suitable for final disposal by insolubilization of the toxic materials, e.g., lead.

The first mentioned alternative procedure for treating the residue concerns the stabilization of undesirable constituents in chlorinator residue such that they will not leach into the environment as determined by a test designed to simulate the environment. This allows the chlorinator residue to be classified as a low level radioactive waste without simultaneously being classified as hazardous waste. The described procedure also does not prevent the residue from meeting other environmental regulation criteria. The addition of substances to inhibit undesirable environmental leaching is common in waste disposal as exemplified by the addition of concrete or asphalt to wastes to seal materials classified as hazardous into an impermeable block. The prevention of leaching by the present addition of chemicals which form highly insoluble compounds with the metals in question in the context described herein has not been previously reported.

In the present procedure shown in the TREATMENT block of FIG. 2, all or portions of the nonvolatile residue of the carbo-chlorination are mixed with chemicals containing carbonates and a base for pH adjustment. As will become further evident from descriptions below, this $CO_3^=$ treatment may be used in combination with other residue, filtrate, or effluent treatments.

The present optimum mixture contains about 10% magnesium oxide and about 2% sodium carbonate. The quantities and composition of these chemicals may be changed, of course, with conditions. The magnesium oxide ensures that the mixture will be basic. Other chemicals such as calcium oxide may be used in the place of magnesium oxide, and compounds such as phosphates or sulfates may be used in place of carbonate. The method is also applicable to other types of waste.

EXAMPLE I

A typical sample of chlorinator residue weighing 88 grams was blended with 2 grams of sodium carbonate and 10 grams of magnesium oxide. The resultant mixture was subjected to the EPA extraction described in the Federal Register Vol. 45, No. 98. The treated sample was placed in a beaker with 1600 ml of water and 400 ml of 0.5N acetic was added bringing the pH to 9. The suspension was stirred for 24 hours. A portion of the liquid was filtered and analyzed. The extraction solution (filtrate) of the present invention contained less than 0.2 milligrams of lead per liter compared to 90 for the extraction filtrate from the untreated sample.

Figure 6:
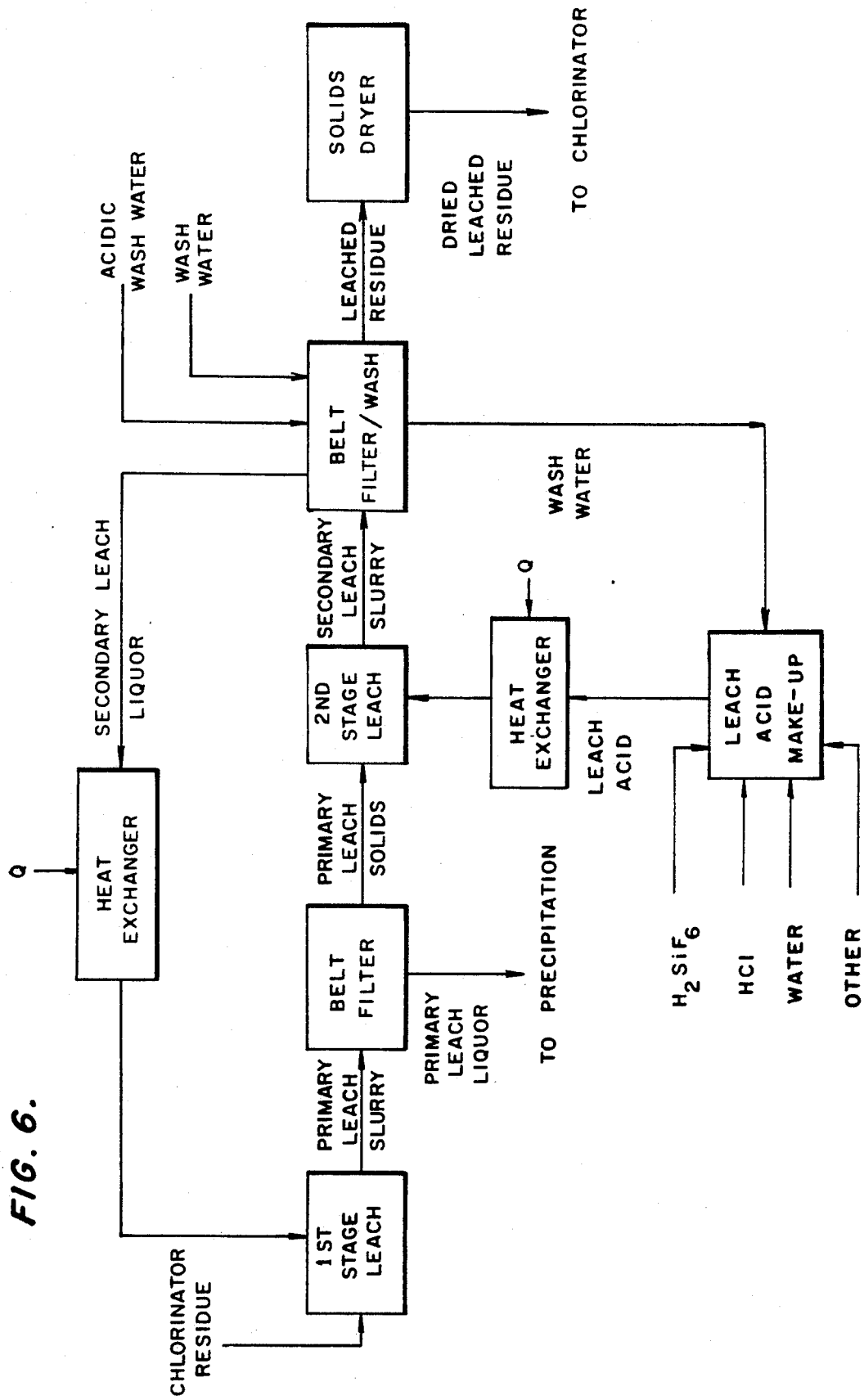
FIG. 6 is a flow diagram of the LEACHING operation shown in FIG. 2.

Referring to the LEACHING block of FIG. 2, and the flow sheet of FIG. 6, where it is desirable to greatly reduce the volume and weight of the waste to be disposed, this alternative finds exceptional utility. As a general statement of this alternative procedure, it is designed to remove metallic chlorides including radionuclides and other undesirable substances from a waste stream to provide a recyclable or disposable product. It is particularly addressed to the removal of metal chlorides from the unreacted constituents of chlorinator residue (i.e., zircon sand and petroleum coke). It has been found that water leaching is not sufficient to produce recyclable products from all chlorinator residues. Specific objects of this procedure include reducing the amount of waste material which must be disposed of as a low-level radioactive waste, thereby reducing the disposal cost. It is also an objective to beneficiate the chlorinator residue by removal of the metal chlorides in order to recycle the unreacted components back to the chlorinator, i.e. zircon sand and petroleum coke; to recover other components from the residue, e.g. scandium, yttrium and rare earths; and to provide a chloride-free feed material to the process for the separation of sand and coke.

These objects are attained by this procedure through the removal of metal chlorides from sand chlorinator residue by acid leaching the residue followed by washing and drying. The process is improved over the prior practice of leaching chlorinator residue and provides for a higher degree, e.g. greater than 95% of metal chloride removal, which facilitates economical recycle to chlorination. Additionally, the substantial removal of the radium and the thorium, reduces the radiological hazards involved with handling the leached residue during recycle.

In a preferred embodiment of this procedure, chlorinator residue is treated in the unit operations shown in the process flow diagram of FIG. 6. Vessel dimensions, flow rates, chemical concentrations and operating temperatures are described hereinafter. The leaching operation is designed to solubilize essentially all metal chlorides. The optimum solution for the leaching operation was 2 normal with respect to hydrochloric acid and 0.01 normal with respect to fluosilicic acid. The preferred temperature is about 80 degrees C., and the optimum reflux time is about 2 hours per stage. Two stages of countercurrent leaching are satisfactory for removal of metal chlorides. The optimum solids to liquids ratio is one gram of chlorinator residue for two milliliters of leach acid.

The described leaching conditions were derived from considerable laboratory experimentation and also engineering judgement as to the selection of conditions for achieving greater than 95% leaching efficiency of metal chlorides while remaining economical relative to alternative leaching methods. The use of more exotic leaching methods such as pressure leaching will also produce the desired result.

Nitric acid is an acceptable alternative to hydrochloric acid for providing an equivalent extraction of metal chlorides from the chlorinator residue. However, nitric acid is more expensive and represents a disposal problem and therefore is not preferred. Additionally, other acids and combinations of acids could provide the desired extractions.

Additional stages of countercurrent leaching would result in equal or greater extraction of metal chlorides. Such would not be preferred due to the added process time and equipment requirements, when two stages are adequate.

Other acceptable ranges for this process are as follows:
Leach acid concentrations ranging up to 12 normal HCL;
Leach time per stage ranging up to 24 hours;
Solids to leach acid ratios from 1 gram/milliliter to 1 gram/10 milliliters or more; and
Leach acid temperatures preferably range from ambient to about 100 degrees C. at atmospheric pressure.

The preferred embodiment includes filtration after each stage of leaching. First stage solid-liquid separation is preferably accomplished by filtration. The filtrate is routed to another area for treatment. The solids are transferred to the second stage leach tank for processing. The solids from second stage leach filtration must be thoroughly washed. Preferably this can be accomplished in the same equipment. The wash water used on the second stage leached solids is applied in four stages of washing. This was determined experimentally to be the optimum number of stages. The amount of wash liquor used in each stage is about one milliliter for each two grams of residue fed to the process. In the first two stages of washing, the wash water must be acidified to a pH of 1 or less. The third and fourth stages use water to remove residual chlorides.

The wash liquors are collected separately from the second stage leach filtrate and used for leach acid makeup. The second stage leach filtrate is routed to a heat exchanger where its temperature is brought up to about 80 degrees C. From there the liquor is sent to the first stage leach tank. This represents a typical countercurrent operation.

The leached solids can optionally be transferred to the drying operation where the moisture content is reduced. The dried leached chlorinator residue would then be ready for recycle to chlorination or subsequent treatment or disposal.

The utility of the present process would extend to any or all residues containing soluble radionuclides and/or other undesirable substances, the extraction of which from the residue may be desirable.

EXAMPLE II

A 500 gram sample of the residue from the carbochlorination of zircon sand was obtained from a chlorinator. The residue was added to a two liter Erlenmeyer flask containing 1000 milliliters of leach acid. The acid was made up of two normal with respect to hydrochloric acid and 0.01 normal with respect to fluosilicic acid. The leach slurry was agitated for two hours at 80 degrees C. and the leach slurry then filtered on a Buchner vacuum filter. The filtered solids were then added to a second flask containing fresh leach acid which had been preheated to 80 degrees C. The residue was again leached for two more hours at 80 degrees C. The slurry was filtered on a Buchner vacuum filter. The solids remaining on the filter were washed twice with 250 milliliters of one normal hydrochloric acid at 60 degrees C. The solids were then washed twice more with 250 milliliters of water. The solids were then removed from the filter and dried in an oven overnight at 100 degrees C. The dried solids were submitted for analysis which showed that 96.9% of the metal chlorides had been removed by the leaching procedure.

The leach liquor from the above described LEACHING procedure is routed as shown in FIG. 2 to the PRECIPITATION block which will be explained in detail hereinafter. Of principle concern to this treatment method is the precipitation and separation of radium from solution. Removal of radium from solution has been studied and practiced for years and includes but is not limited to the following techniques: barium sulfate co-precipitation; lime soda softening; ion exchange; reverse osmosis; selective membrane mineral extraction; and extraction by manganese impregnated acrylic fibers. The maximum dissolved radium that these processes will successfully treat to meet drinking water limits is reported to be 1500 pCi/l (Trace Metal Data Institute, 1981). It was reported by Reid (Reid et al, 1985) that Kerr-McGee had experimentally treated radium solutions as high as 60,000 pCi/l with a Ba precipitation process. No literature was found on precipitating solutions greater than 60,000 pCi/l. The reference publications are:

Reid, G. W., Lassovszky, P., Hathaway, S., "Treatment, Waste Management and Cost for Removal of Radioactivity from Drinking Water", Health Physics, Vol. 48, No. 5, 1985, and Trace Metal Data Institute, "Bulletin 607: The current status of radium removal technology", 1981.

The principal object of this aspect of the overall process is to precipitate radium from solution to allow safe discharge of the solution to the environment. Radium must be separated from the liquors to the level required by environmental laws and regulations before discharge to the environment can take place.

One of the unobvious features of this invention lies in the successful treatment of levels of radium which are higher than those previously noted in the literature (60.000 pCi/l). The removal of radium from a solution to less than 50 pCi/l and even less than 10 pCi/l in a single stage precipitation and filtration or other means of separation and in any event reaching these levels with no more than two stages of precipitation and filtration is unexpected. The treatment of solutions with hundreds of thousands and even into the millions of pCi/l of radium are possible by this procedure.

In carrying out this procedure, the solution containing the radium is treated as shown in FIG. 8 and described hereinafter.

a) $BaCl_2$ is added at several fold to hundreds or even thousands fold the concentration of the radium, and allowed to dissolve. The temperature of the liquor may range from hot to cold and the pH from less than 1 to 14 with the preferred pH in the range of 2 to 7. If the pH is not in the preferred range, acids or bases should be used to reach this range. Such acids and bases include essentially any compounds for which the net effect is to alter the pH of a system or solution.

b) Sodium sulfate or any other source of soluble sulfate is then added in excess of the concentration of the barium plus radium ion equivalents and any other cations which might combine with the sulfate ions, i.e. calcium, rare earths, or the like. If the solution is cold, it should be heated and a digestion allowed to take place which can range from a fairly short time up to hours or days. The preferred digestion period would be a few hours with agitation in most cases.

c) Upon completion of the digestion, the solution is cooled and separated from the precipitates by the use of any of a number of solid liquid separation techniques. A pH adjustment before separation may enhance the separation process and should be considered in each system where this invention is applied.

This procedure allows the precipitation of radium ions from a liquid stream, and the safe discharge of the treated liquid. It also allows for concentrating of radioactive waste by precipitating the radioactive components from the leach liquors that have been used to remove radium from radioactive waste.

EXAMPLE III

A 2 normal acidic solution containing 720,000 pCi/l of radium was treated as follows:

One and one half liters of solution was first heated to 90 degrees C. and the pH thereof adjusted to 4.0 using MgO to neutralize the acid. After the dissolution of the MgO was complete, 48.75 g of $BaCl_2.2H_2O$ was added and stirred for five minutes. At this point, 225 g of $Na_2SO_4$ was added a little at a time. Precipitation and flocculation were evident as soon as the $Na_2SO_4$ was added. The solution was then allowed to digest for two hours at temperature while being stirred, and then cooled over night without stirring.

Separation of the solids from the solution was accomplished by a 0.47 micrometer Millipore filter type HA. The radium level was less than 9 pCi/l after this single-stage treatment.

Referring to the FLOTATION block, (FIG. 2, detail shown in FIG. 7) the object of this procedure is to separate an intimate mixture of finely-divided zircon and finely-divided petroleum coke to achieve a petroleum coke product containing less than one percent by weight zircon and a zircon product containing less than five, preferable less than one weight percent petroleum coke. This separation simplifies the disposal of the coke or sale of the coke to a subsequent user, and also facilitates recycle or disposal of the zircon. In this regard it is known that materials containing radionuclides present disposal difficulties, even if the radioactivity is low-level and the radionuclides are in an non-leachable form, as are the radium, uranium and thorium in zircon which are bound up in the zircon crystals. Leached residue from carbo-chlorination of zircon contains radium typically at levels of about 30 pCi/gm $Ra^{226}$, and even though more than 75% of this $Ra^{226}$ is contained in the zircon crystals, and thus non-leachable, disposal of leached residue in a landfill is precluded, discouraged or undesirable, leaving only more expensive disposal options. Moreover, the presence of zircon in petroleum coke ordinarily precludes its use as a feed for other processes, for example, the smelting of various metal ores or as a fuel additive. The petroleum coke typically constitutes 80%-90% of the weight of the leached residue, or 96% to 98% of the volume of the leached residue, so that freeing it from zircon, so that it can be disposed of cheaply, constitutes a considerable saving over disposing of it in a more expensive facility for materials containing low-level radioactivity. The possibility that the coke may be sold as feed for other processes is even more attractive. In the present process, the zircon fraction, being recovered essentially free of coke, constitutes typically only 2%–4% of the volume of the original leached residue, and the cost of disposing of this in a special site is much less than the cost of disposal of the whole of the residue. Further, under some circumstances, the zircon may be suitable for recycle as feed to carbo-chlorination processes.

Figure 7:
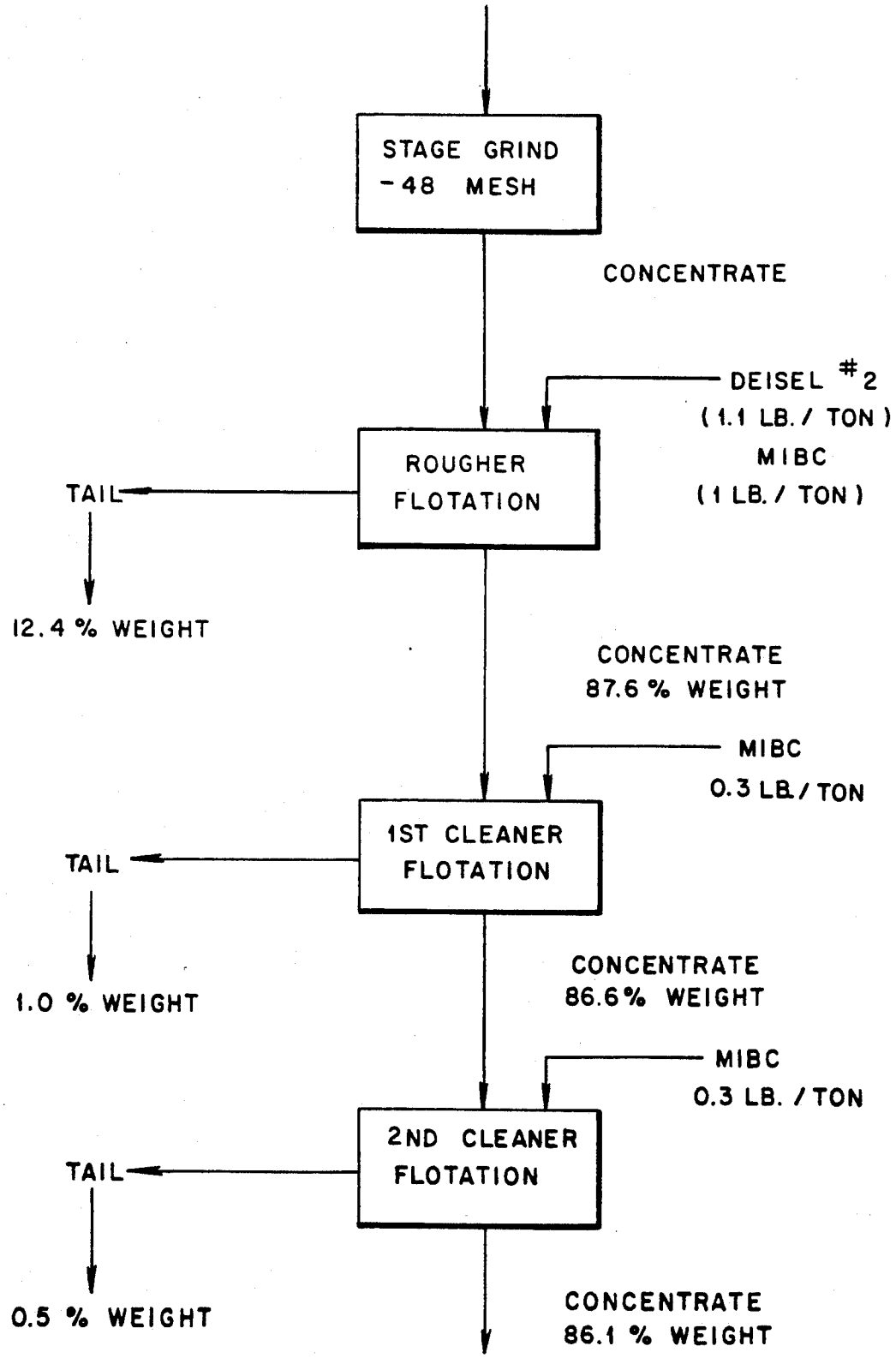
FIG. 7 is a schematic of an apparatus useful for the FLOTATION operation shown in FIG. 2.

This separation procedure for which a typical apparatus with descriptive legends is shown in FIG. 7, uses the froth-flotation process wherein the feed, a mixture of carbon and zircon containing usually 5 to 30 percent zircon by weight, but actually in any proportions from less than 1% zircon to over 99% zircon by weight, is ground to pass a 48-mesh screen, slurried with water and treated with, for example, diesel oil or any other suitable flotation-agent for the coke, and methyl isobutyl carbinol or any other suitable collector. The slurry is agitated and sparged with air, and the underflow removed as a slurry of essentially coke-free zircon. The overflow goes to a second agitated, air sparged cell, whence the underflow is added to the feed of the first cell, and the overflow goes to a third agitated air-sparged cell. The underflow from the third cell goes to the feed of the second cell and the overflow goes to a filter which collects essentially zircon-free coke which may be sent for disposal as wet-cake if it contains no standing liquid, or which may be dried for sale to a subsequent user.

EXAMPLE IV

A sample of leached residue was gently ground to delump it and to permit it to pass a 48-mesh screen. It was then agitated with water and treated with No. 2 diesel oil at a dose-rate of 1.1 lb of oil per ton of leached residue, and with methyl isobutyl carbinol at a dose rate of 1 lb per ton of leached residue, and frothing commenced by air sparging for the first stage of the flotation. The tail from this operation comprised 12.0 weight percent of the sample and was essentially pure zircon, free of coke. The frothed material overflowed to the second stage of flotation where further methyl isobutyl carbinol was added, at a rate of 0.3 lb per ton of sample. The tail from this stage was 1.0 percent of the initial weight of the sample. The frothed material overflowed to a third stage of flotation where a material addition of methyl isobutyl carbinol was made at the same rate. This produced a tail amounting to 0.5 weight percent of the initial sample weight and a floated product which on drying comprised 86.1 weight percent of the original sample, and which had an ash weight of 1.1%. Subsequent analysis showed this material to be 0.65 weight percent zircon, and to have a radium content of 3.2 pCi/gm.

In regard to the RECYCLE block, this procedure involves the recycle of the leached zircon sand/petroleum coke mixtures for reprocessing in the fluidized-bed chlorinator. It is particularly noted that even though chlorinator residues have been thoroughly leached and washed to remove salt impurities and soluble radionuclides, and are thoroughly dried, the problem remains of how to combine this material with the appropriate amount of milled zircon to obtain a feed mix suitable for efficient fluidized-bed chlorination. In accordance with the present recycle procedure, the recycle mixture which is already of sufficiently small particle size is combined with the appropriate quantity of milled zircon (50% $-325$ mesh) to give a chlorinator feed mix containing approximately 80% zircon and 20% coke by weight, which is suitable for rechlorination. The feed is processed under normal chlorinator operating conditions, with roughly one pound of residue obtained for every 14–21 pounds of feed introduced. Therefore, for every 3.33 to 5 pounds of original residue after leaching, one pound of final residue remains after single-stage rechlorination, a reduction of 70–80%. In order to place the treated residue recycle in proper perspective the following general and specific comments are given. In the carbo-chlorination of zircon, chlorine serves as the fluidizing gas in the chlorinator, which is operated at about 1050 degrees C. and slightly above atmospheric pressure. Zirconium tetrachloride, hafnium tetrachloride, and silicon tetrachloride vapors leave the chlorinator and are selectively condensed. Other chlorides, such as yttrium, thorium, and calcium, are produced in trace amounts and exist as liquids in the hot fluidized bed. These liquid chlorides accumulate in the bed, inhibiting fluidization and eventually causing a significant decrease in reactor efficiency, which results in lower chlorine utilization and reduced zirconium tetrachloride production. These conditions require the chlorinator to be shut down, and removal of the zircon/coke residue contaminated with chloride salts. Typically, one pound of residue is generated for every 20 pounds of feed mix chlorinated.

For every 100 pounds of original residue containing ten pounds of chloride salts, approximately 90 pounds remain after leaching, washing, and drying, of which 75 pounds is nominally coke and 15 pounds is zircon. In order to obtain a feed mix having the desired 80/20 weight ratio of zircon and coke, 285 pounds of milled zircon are blended with the 90 pounds of leached residue to give 375 pounds of feed mix. After chlorination, roughly 18–27 pounds of final residue, equivalent to 5–7% of the feed mix, remain. Therefore, rechlorination reduces the quantity of residue requiring disposal from 90 to 18–27 pounds, or by 70–80%. This reduction in the quantity of residue can be highly variable, depending on the extent of leaching and chlorination employed.

This procedure allows for the recycle of a waste material (leached chlorinator residue) which otherwise would require expensive disposal. Even though the salt impurities and soluble radionuclides are removed by leaching, the remaining zircon contains enough naturally-occurring radionuclides to render the material a low-level radioactive waste. Therefore, recycle by rechlorination significantly reduces the disposal costs and at the same time produces zirconium, hafnium, and silicon tetrachlorides. This is all accomplished using existing chlorination equipment. The invention is also applicable to the residues generated from the high-temperature fluidized-bed chlorination of a variety of oxides including $ZrO_2$, $HfO_2$ and $TiO_2$, minerals (bad-deleyite, rutile, etc.), and other related materials.

EXAMPLE V

A fluidized-bed chlorinator test unit was constructed in the laboratory, consisting primarily of a chlorination reactor, disengagement section, condensers, and chlorine and nitrogen metering equipment. The reactor was comprised of a 2"-ID by 24-inch high opaque quartz tube with porous graphite distributor, encased in electric-resistance clamshell furnace heaters. A 4"-ID nickel disengagement section was placed above the reactor and densely-wrapped with beaded nichrome wire elements. A filter was installed between the disengagement section and condensers to retain fine solids in the chlorinator.

Zirconium and hafnium tetrachloride vapors were condensed in two barn condensers, equipped with external cooling-water jackets. The remaining off-gases, containing primarily chlorine, carbon monoxide, carbon dioxide, phosgene, silicon tetrachloride, and nitrogen purge gas, were treated in a caustic scrubber. Samples of off-gas were also collected and analyzed by gas chromatography.

Chlorine and nitrogen gases were carefully metered into the system, utilizing rotameters and a network of nickel tubing and valves. Controlling and indicating thermocouples were used together with analog controllers to maintain the desired temperatures for each piece of equipment. All heated surfaces were insulated with 1" silica glass-fiber blanket, held in place with glass-wool tape.

Initially, 1515 grams of leached residue, containing 17.8% zircon sand and 82.2% petroleum coke by weight, were blended with 4485 grams of milled virgin zircon to yield 6000 grams of feed mix containing 79.2% zircon and 20.8% coke. This material successively chlorinated batchwise in 400–500 gram increments in the 2"-ID laboratory fluidized-bed reactor. The reaction temperature was 1050 degrees C., and the chlorine flow-rate was 3.0 liters per minute measured at room temperature. The zirconium and hafnium tetrachlorides produced were condensed at 50–60 degrees C., and no effort was made to recover the silicon tetrachloride.

Twelve separate two-hour batch experiments were performed, reducing 5600 grams of feed mix (400 grams were set aside for chemical analysis) to a final weight of 407 grams pulled from the chlorinator. For each run, the bed was brought up to temperature while being fluidized with inert nitrogen gas. Once operating conditions were established, chlorine was introduced as the fluidizing gas, as the nitrogen was shut off. After each run, enough feed mix was charged to the reactor to replace that which had been chlorinated away.

Overall, 5121 grams of crude zirconium tetrachloride product were collected, corresponding to a yield of 91%. Since the amount of final residue remaining was 407 grams and the initial residue before rechlorination was $(1515)(5600/6000) = 1414$ grams, a 71% reduction was achieved. This percentage could have been increased by extending the run time of the last experiment.

The analytical monitoring of the present recovery process, particularly as regards radium levels, principally concerns the cooperative interaction of the off-gas filter condition as detected by monitoring of thorium levels in the off-gas. In general, however, this procedure is useful for the determination and control of radium levels throughout the process. The usefulness of this procedure is three fold. First in the production of zirconium and hafnium chemicals which are low in radium, second in the area of waste prevention and minimization, and third this process can be used in other chemical and ore processing operations where radium is present.

To avoid contamination and exposure to the general public, commercial chemical products need to be substantially free from radium. The general public may be exposed to radium three distinct ways. The exposure may be direct in the form of chemicals used in consumer goods such as cosmetics. The exposure may also result from the concentration of radium in waste products. A third way of creating an exposure is by further refining of chemical products in such a way as to concentrate radium in a subsequent product, by product or waste.

The generation of waste streams which contain levels of radionuclides and other undesirable substances in excess of background levels greatly limits the disposal options and increases the present and future cost of producing zirconium and other metals.

This process can also be applied to many production situations where radium concentrations cannot be measured and reported in short enough time to be useful to control the production process.

Radium is liberated in the form of radium chloride from the zircon sand crystal in the production of crude zirconium chloride. Radium chloride is retained in the reactor bed by filters. Failure of the filters results in release of significant amounts of radium. Rapid detection of a failure by measuring the radium concentration downstream of the filter is impossible by known analytical techniques due to the length of time required to complete the analysis.

Past practice to determine failed filters consisted of using the black water test. The black water test is a test in which a measured amount of zirconium tetrachloride is dissolved in measured amount of water. If the color of the solution is black, then a filter may have failed. The black solution is an indication that particles have passed through to filter. These particles are known to contain radium. This test did not reliably determine if filter failure had occurred. Therefore a better method for determining filter failures was required. Thorium chloride like radium chloride remains non volatile in the reactor and will not be present in measurable quantities if the filters are intact. Samples were taken of crude chloride and analyzed by direct current plasma emission spectrometry (DCP) for thorium. DCP is a suitable technique for measuring thorium at levels to 10 ppm. The measurement of thorium in the crude chloride can be used to detect filter failures.

Because of the detection limit of thorium with the DCP, occasionally filter failures were not detected until the failure had been in progress for some time. Therefore thorium analysis was undertaken by an alternate method. Inductively coupled plasma mass spectroscopy (ICPMS) was used having as the detection limit about 0.1 ppm thorium. Fundamentals of Integrated GC-MS by B. J. Gudzinowicz, M. J. O. Gudzinowicz, H. F. Martin, Marcel Dekker, Inc. New York, 1976. Filter failures are now readily detected. Therefore, by using thorium as a tracer for radium, radium releases can be minimized.

The invention has been described in detail with particular reference to preferred embodiments thereof, but it will be understood that variations and modifications will be effected within the spirit and scope of the invention.

We claim:

1. A process for the separation and removal from metal ores of inherently present and unwanted hazardous impurities selected from the group consisting of Ra, Th, U and lead which comprises:

halogenating the metal in the ore in a halogenation medium to produce a gaseous halogenated metal-containing product stream and a residue wherein said metal-containing product stream is condensed to separate volatile silicon halogen compounds, from a product stream containing condensed metal halides;

treating said metal halides with acid to produce a solution of soluble salts of said metals;

adjusting in a first stage, the pH of said solution into the range of from about 1 to about 3, to separate certain metal salts by precipitation and in a second stage adjusting the pH of the solution remaining after precipitation to a value of from about 3 to about 7 to precipitate other metal salts;

wherein said residue is further treated by leaching with an acid aqueous solution to solubilize and remove minor amounts of hazardous impurities from the unreacted ore and halogenation medium to produce a leach liquor;

contacting said leach liquor with barium ions and sulfate ions in sufficient concentration to co-precipitate barium and radium ions as an insoluble sulfate complex and lead and other metals as sulfates or hydroxides.

2. A process for the removal from metal ores of inherently present, unwanted, hazardous impurities selected from the group consisting of radium, uranium, thorium and lead, which process comprises halogenating the metal in the ore in a halogenation medium to produce a gaseous halogenated metal-containing product stream and a residue, wherein said metal-containing product stream is condensed to separate volatile silicon halogen compounds from a product stream containing condensed metal halides, treating said metal halides with acid to produce a solution of soluble salts of said metals adjusting in one stage the pH of said solution into the range of from about 1 to about 3 to separate certain metal salts by precipitation, and in a second sage adjusting the pH of the solution remaining after precipitation to a value of from about 3 to about 7 to precipitate other metal salts, and wherein at least a portion of said residue is contacted with a salt selected from the group consisting of salts containing carbonate, sulfate and phosphate and mixtures thereof, and sufficient base to subsequently maintain, upon disposal, a soil pH of great than 7 and to render the amounts of lead and other metals remaining in said residue substantially nonleachable by standard EPA tests.

3. A process for removing the radioactive and non-radioactive metal impurities from zircon sand to obtain substantially pure zirconium whereby said radioactive metals comprise Ra, U, Th and Pb and other nonradioactive metals include Hf, said process comprising contacting zircon sand in a chlorinator with a chlorination medium to form an off-gas stream containing chlorides of Zr, Hf, Si, and trace U, and to form a non-volatile residue stream containing unreacted zircon sand and chlorination medium, and trace Ra, Pb and other metals, wherein in said process said off-gas stream is passed to a condenser to remove volatile Si chlorides and thereby provide a product stream containing condensed chlorides of Zr, Hf and trace U, treating said product stream in acidic aqueous medium in a separation stage to separate Hf from Zr, wherein said metals are discharged from the separation stage in soluble salt form in separate effluent streams each of which contains minor amounts of the other metals, and either or both of which streams contains said trace U also in soluble salt form, adjusting the pH of at least one of said effluent streams or portions thereof in a first stage to between about 1 to about 3 to precipitate said minor amounts of Zr and Hf, and adjusting the pH of the resulting effluent to between about 3 to about 7 in a second stage to precipitate said trace amounts of U, and where, in said process, said residue stream is treated by (a) leaching with an acidic aqueous system to solubilize said trace Ra, Pb and other metals while settling out said unreacted zircon sand and chlorination medium, and contacting the resultant leach liquor with barium ions and with sulfate ions to co-precipitate the barium and trace radium ions as a sulfate complex and the trace lead and other metal ions as their sulfates or hydroxides, or by (b) contacting at least a portion of said residue stream with a salt selected from the group consisting of salts containing $CO_3=$, $SO_4=$ and $PO_4=$ and mixtures thereof, and sufficient base to maintain a soil pH greater than 7 and to render said trace amounts of lead and other metals substantially non-leachable in the standard EPA test.

4. The process of claim 1 wherein the separated unreacted ore and halogenation medium are recycled for subsequent use in the halogenation of metal-containing ores.

5. The process of claim 1 wherein said unreacted halogenation medium obtaining from the residue stream after acid leaching is a coke material which is subsequently separated from the unreacted ore by floatation, and the unreacted ore is recycled for subsequent use in the halogenation of metal containing ore.

6. The process of claim 1 wherein either or both of said effluent streams are treated with $H_2SO_4$ prior to said pH adjustments.

7. The process of claim 1 wherein said gaseous halogenated metal containing product stream is filtered prior to the step of condensing to substantially eliminate particulate solids from reaching the condensate from said condensing step.

8. The process of claim 7 wherein the product stream after filtration is monitored for thorium level, and wherein said filter means is replaced when predetermined levels of thorium are detected.

9. The process of claim 8 wherein process control of radium levels in gaseous and liquid streams is achieved by the detection of thorium amounts with ICP mass spectrometry.

10. The process of claim 2 wherein said residue is contacted with carbonate and said base is magnesium oxide.

11. The process of claim 3 wherein said unreacted zircon sand and chlorination medium are recycled to said chlorinator.

12. The process of claim 3 wherein said unreacted chlorination medium from the leaching step is coke material which is separated by flotation from the unreacted zircon sand, and wherein said sand is then recycled to said chlorinator.

13. The process of claim 3 wherein filter means is provided in said off-gas stream to block the passage of particulate solids to said condenser.

14. The process of claim 3 wherein said residue in (B) is contacted with $CO_3=$ in a base buffered aqueous system.

15. The process of claim 3 wherein said principal Zr and Hf values are separated into separate effluent streams by extraction of said Hf values in a solvent medium.

16. The process of claim 3 wherein either or both of said effluent streams are treated with $H_2SO_4$ prior to said pH adjustments.

17. The process of claim 13 wherein the gas stream downstream of said filter means in monitored for thorium level, and wherein said filter means is replaced when predetermined levels of thorium are detected.

18. The process of claims 13 or 17 wherein process control of radium levels in gaseous and liquid streams is achieved by the detection of thorium amounts with ICP mass spectrometry.

19. Substantially radium free zirconium and hafnium compounds produced from zirconium and hafnium prepared by the process of claims 1 or 3.

20. A process for preventing the leaching of metal containing residues by water comprising the steps of treating said residue by contacting said residue with a salt selected from the group consisting of salts containing carbonate, sulfate and phosphate and mixtures thereof, and sufficient base to subsequently maintain, upon disposal, a soil pH of great than 7 and to render the amounts of lead and other metals remaining in said residue substantially non-leachable by standard EPA tests.

21. The process of claims 1 or 3 wherein the leach liquor before contacting with barium ions and sulfate ions is treated with base.

22. The process of claims 1 or 3 wherein the leach liquor before contacting with barium ions and sulfate ions is treated with a compound selected from the group consisting of magnesium oxide and sodium hydroxide and mixtures thereof.

23. The process of claim 21 wherein sufficient base is added to raise the pH value of the leach liquor to a pH of from about 2 to about 7.

24. The process of claim 21 wherein sufficient base is added to raise the pH value of the leach liquor to a pH of about 4.

25. The process of claims 1 or 3 wherein the leach liquor after co-precipitation is treated with a base.

26. The process of claim 25 wherein said base is selected from the group consisting of magnesium oxide and sodium hydroxide and mixtures thereof.

27. The process of claim 25 wherein sufficient base is added to raise the pH of the leach liquor to a pH of from about 2 to about 14.

28. The process of claim 25 wherein sufficient base is added to raise the pH of the leach liquor to a value of from about 7 to 9.

29. The process of claims 1 or 3 wherein the leach liquor contains greater than 60,000 pCi/l of radium.

* * * * *